No. 731,552. PATENTED JUNE 23, 1903.
J. T. DUFF.
PULLEY.
APPLICATION FILED OCT. 25, 1901.
NO MODEL.

WITNESSES:
J. A. Herron
O. D. Levis

INVENTOR
John T. Duff,
by his attorney
M. E. Harrison

THE NORRIS PETERS CO., PHOTO-LITHO., WASHINGTON, D. C.

No. 731,552.

Patented June 23, 1903.

UNITED STATES PATENT OFFICE.

JOHN T. DUFF, OF ALLEGHENY, PENNSYLVANIA.

PULLEY.

SPECIFICATION forming part of Letters Patent No. 731,552, dated June 23, 1903.

Application filed October 25, 1901. Serial No. 80,014. (No model.)

*To all whom it may concern:*

Be it known that I, JOHN T. DUFF, a citizen of the United States of America, residing at Allegheny, in the county of Allegheny and State of Pennsylvania, have invented certain new and useful Improvements in Pulleys; and I do hereby declare the following to be a full, clear, and exact description thereof, reference being had to the accompanying drawings, which form a part of this specification.

My invention relates to an improvement in wrought iron or steel pulleys or wheels; and it consists in certain details of construction and combination of parts, as will hereinafter more fully appear.

To enable others skilled in the art to make and use my invention, I will now describe the same, reference being had to the accompanying drawings, forming part of this specification, in which—

Figure 1:
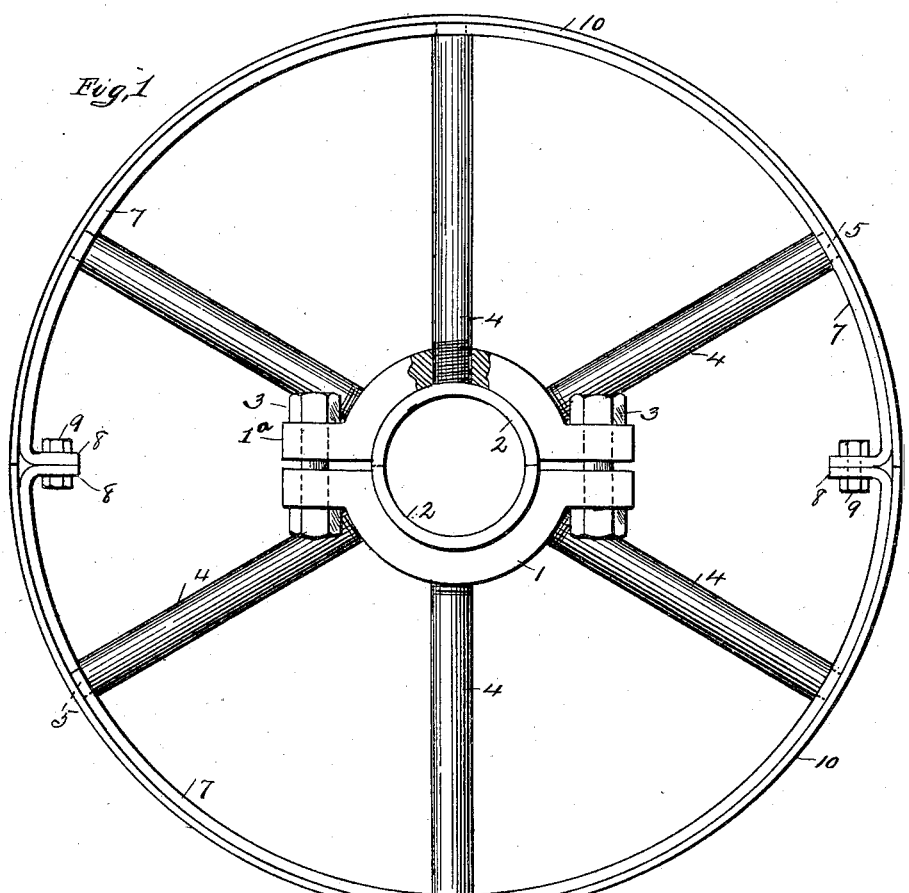
Figure 2:
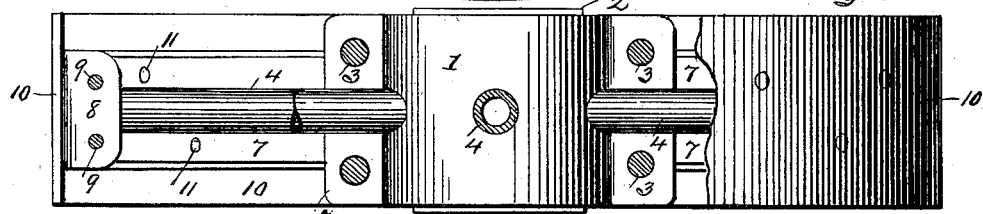
Figure 3:
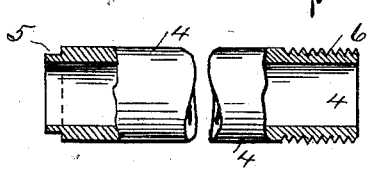

Figure 1 is a side view of a pulley constructed in accordance with my invention. Fig. 2 is a top plan view, partly in section. Fig. 3 is an enlarged detail view showing the construction of the spokes.

Like symbols of reference indicate like parts.

The hub of the pulley is formed of two rolled sections 1, duplicates of one another, and each consisting of a semicircular portion having integral laterally-extending flanges 1ª, through drilled holes in which extend bolts 3. The sections 1 of the hub are lined with a split bushing 2 for the usual purpose. At regular intervals in each section of the hub are threaded openings into which are screwed the threaded ends 6 of tubular spokes 4, the other ends of said spokes being abruptly reduced in diameter to form unthreaded portions 5. Encircling the extremities of the spokes 4 is a sectional circular band 7, the extremities 8 of each section being bent inwardly and provided with openings through which bolts 9 extend for joining the sections together. The bands 7 are provided with openings or recesses registering with the ends 5 of the spokes, the ends 5 extending into said holes or recesses for the purpose of joining the spokes and band together. Each section of the band 7 is provided with a rim 10, attached thereto by countersunk rivets 11, the two parts 10 meeting at their ends and constituting the periphery of the pulley.

From the foregoing description and an inspection of the drawings it will be apparent that my improved wrought-iron pulley may be readily taken apart and adjusted to a shaft and that the same is very durable, strong, and can be made at a very low cost.

It will be readily understood that wheels may be constructed in the manner hereinbefore described.

I claim—

As a new article of manufacture, a split pulley or wheel, consisting of a two-part hub joined together by bolts, each part being formed of an integral piece of metal and having provision for attachment of the inner ends of the spokes, a wrought-iron band consisting of sections the ends of each of which are bent inwardly and suitably connected together, said sections having recesses or holes into which extend the unthreaded outer ends of the spokes, and a sectional rim secured to the outer face of the sectional band, spokes extending between and connected to said hub and to said band, the whole being so constructed that upon the disconnection of the parts of the sectional band and of the sectional hub the pulley may be taken apart for attachment to a shaft, substantially as described.

In testimony whereof I have hereunto affixed my signature in the presence of two subscribing witnesses.

JOHN T. DUFF.

Witnesses:
C. C. LEE,
O. D. LEVIS.